United States Patent [19]
Palms

[11] 4,060,036
[45] Nov. 29, 1977

[54] ANCHORED TRANSPORTATION DEVICE

[76] Inventor: Joseph X. Palms, 80 Lakeshore, Grosse Pointe, Mich. 48230

[21] Appl. No.: 722,807

[22] Filed: Sept. 13, 1976

[51] Int. Cl.² .............................................. B60P 7/08
[52] U.S. Cl. ............................... 105/368 T; 105/473; 248/503
[58] Field of Search ............ 105/368 R, 368 B, 368 S, 105/368 T, 473, 474, 475, 480, 463; 248/119 S, 119 R, 503, 505; 52/23, DIG. 11; 244/110 R, 115; 280/179 R, 179 A, 179 B

[56] References Cited
U.S. PATENT DOCUMENTS

| | | | |
|---|---|---|---|
| 1,973,624 | 9/1934 | Hanlon | 105/368 T |
| 2,046,855 | 7/1936 | Tobin | 105/368 T X |
| 3,520,555 | 7/1970 | Blair | 105/368 T X |

Primary Examiner—Albert J. Makay
Attorney, Agent, or Firm—Burton, Parker & Schramm

[57] ABSTRACT

Described is a lading harness support for use on flatbed transportation devices comprising a base which is anchored to the transportation device; at least a pair of parallel leg members attached to said base and extended therefrom and a rod-like anchor means extending longitudinally with respect to the base and spaced therefrom and fixedly attached to said leg members in an I-shaped manner. When the transportation device carries agricultural combines or other off-the-road vehicles, the lading harness support anchors the same thereto.

3 Claims, 4 Drawing Figures

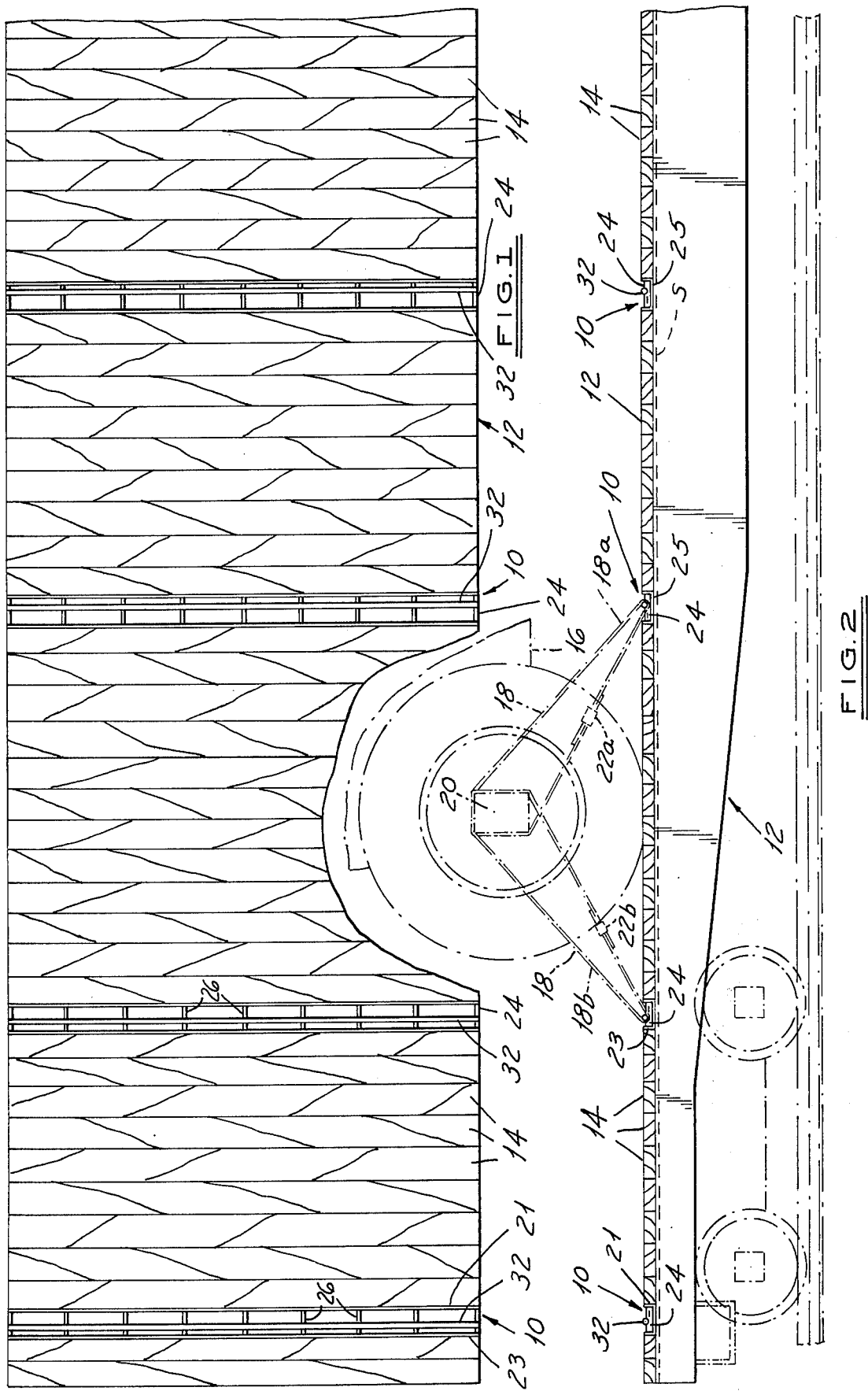

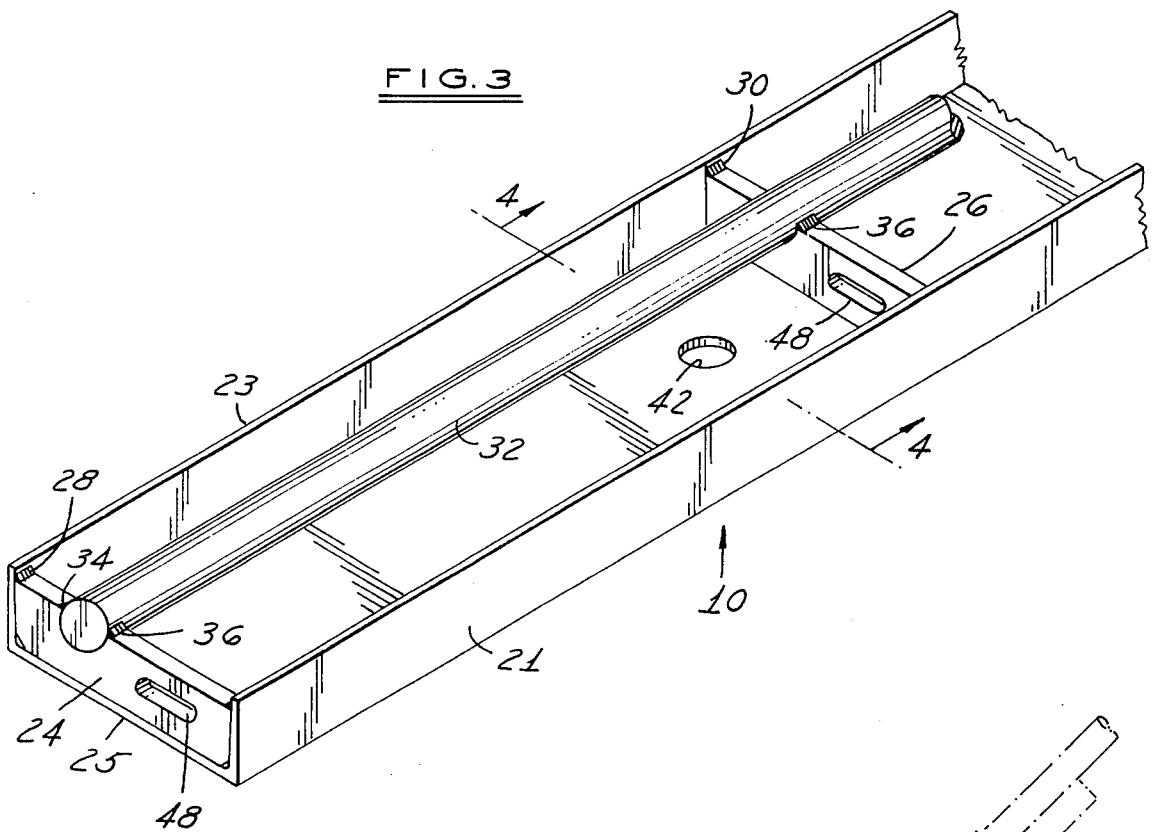
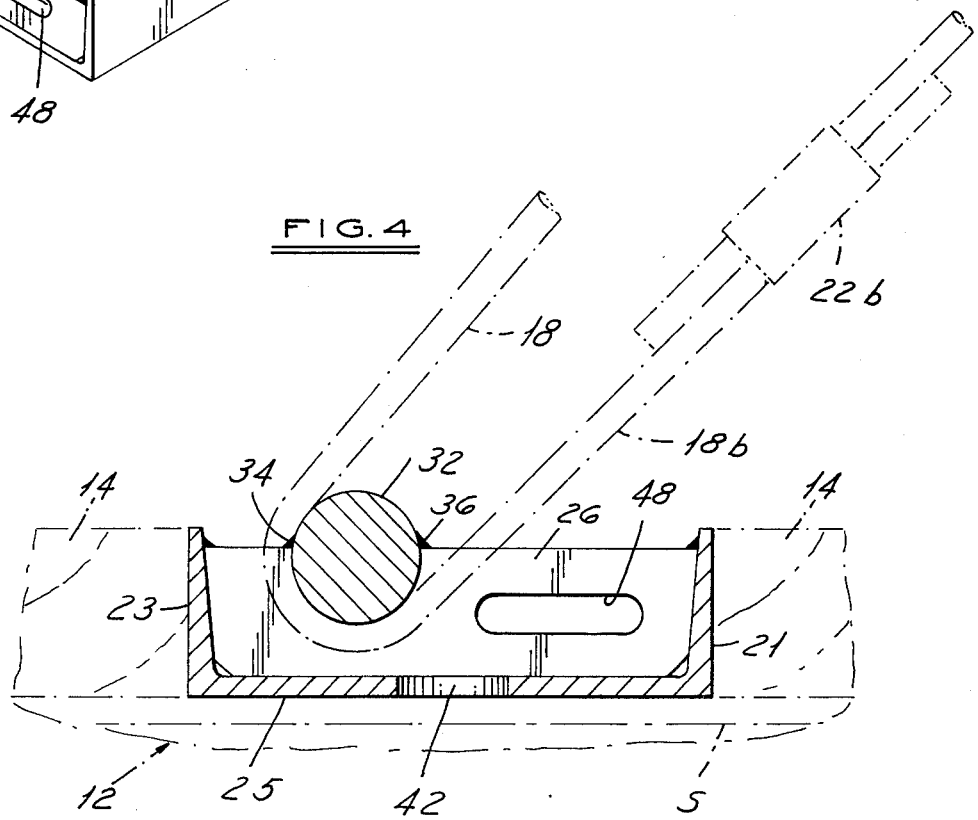

ANCHORED TRANSPORTATION DEVICE

BACKGROUND OF THE INVENTION

Flatbed transportation devices such as flatbed railroad cars and the like are a common means of transporting large off-the-road vehicles. These transportation devices are susceptible to sudden jolts and stops such as occurs during the switching operation in the railroad train yards. During such a stop, the anchoring cable for restraining movement of the vehicles on the flatbed cars is subjected to substantial tension forces and if not anchored securely will tear loose from the cars. Recent safety standards have accentuated the need for adequate anchoring or tie-down devices.

Lading strap anchors have been described in a number of references such as U.S. Pat. Nos. 3,604,365; 2,755,747; 2,846,957; 2,870,722; 2,733,670 and 2,716,382.

BRIEF DESCRIPTION OF THE DRAWINGS

FIG. 1 is a top view of the lading harness support of the present invention mounted into a flatbed transportation device as a railroad flatbed car;

FIG. 2 is a side view of FIG. 1 with a partial showing of the means for securing a wheeled vehicle such as a combine to the transportation device;

FIG. 3 is a sectional plane view of the lading harness support; and

FIG. 4 is a side sectional view of FIG. 3 taken along lines 4—4.

DESCRIPTION OF PREFERRED EMBODIMENT

The lading harness support of the present invention is preferably anchored onto the support sills of a transportation device such as a flatbed railroad car flush with the load supporting surface of the car to permit uninterrupted movement thereover, as during loading and unloading of the lading.

Described is a lading harness support comprising a pair of parallel leg members and a rod-like harness anchor means extending between said leg members and fixedly attached thereto in an I-shaped arrangement.

Most preferably, the lading harness support 10 is mounted in a plurality of equally spaced apart sections of a flatbed railroad car 12 having a plurality of wooden beams 14 extending widthwise across the railroad car. The lading harness support of the present invention is preferably inserted into the gap formed by removing all or part of one of the wooden beams 14.

The lading harness supports are used to carry or secure off-the-road vehicles best shown in FIG. 2 as an agricultural combine 16 to the flatbed railroad car. The combine axle 20 is secured by cables 18a and 18b to the transportation device, that is, the railroad car 12. The axle of the combine has cables 18a and 18b looped around it and they are held in a stable position by cable clamps 22a and 22b respectively.

The lading harness support 10 is preferably comprised of an elongated U-shaped channel made up of sides 21 and 23 and a base section 25 having a plurality of parallel web members arranged in spaced apart relation and extending transversely across the open channel as best shown FIGS. 1 and 3. The web members at opposite ends of the channels are designated 24 and those intermediate the ends as 26. The webs are welded to the U-shaped channels as at points 28 and 30. A rod-like, cylindrical harness anchor means, preferably a rod 32, is welded to each of the webs as at points 34 and 36.

While any cylindrical or curved shape could be used for the anchor means, a round rod is preferred because there is no sharp edge which could cause the restraining cables to break. By welding the rod-like anchor at the top of the parallel web members at points 34 and 36, there is room for the securing cable 18 to be looped thereunder as best shown in FIG. 4.

The base 25 of the U-shaped channel is secured to the transportation device by welding the same to the sills S or understructure of the flatbed railroad car. The U-shaped channel is also supplied with a drain hole 42 which would facilitate the release of rain water and the like from the U-shaped channel.

As can best be seen in FIG. 4, the rod 32 is spaced off center from the sides 21 and 23 of the U-shaped channel. This would facilitate the looping of the cable 18 around the rod and angled toward the axle of the combine on the railroad flatbed car, this prevents any contact or frictional movement between the cable and the U-shaped channel which could cause rupture or slicing of the cable during a sudden stop of the transportation device.

In order to make full utilization of the strength of web members 24 and 26, a seat 38 in the shape of a semi circle is cut into each web member and the rod is nested and welded therein. As can be seen from FIG. 4, when the combine subjects the rod 32 to a high stress when the transportation device stops suddenly, the stress has a horizontal component, i.e., the rod 32 is pulled toward side 21 from seat 38. If the rod 32 was merely welded atop web 26 only the weld joint 36 would prevent the rod from moving. The design of the present invention preferably employs the stronger arrangement of the rod 32 within the web seat 38. Due to the rigors to which the support of the prevent invention is subjected, the lading harness support is generally fabricated of iron, steel and the like.

It is also to be appreciated that the lading harness support should be placed in the transportation device such that the rod 32 is in a plane parallel to the combine axle 20. This facilitates looping of the securing cables 18a and 18b over the axle and the rod 32. A pair of the lading harness supports of the present invention placed on opposite sides of a combine axle will securely hold a combine when the cables are made taut. Because the channels and rods extend entirely across the width of the flatbed car, the restraining cables may be secured at any point desired across the car's width. The webs will also prevent appreciable sliding of the cable lengthwise of the rod should the lading be subjected to substantial transverse movements on the railway car.

If desired the webs 26 may be provided with slot-like through apertures 48 adjacent the rod 32 for receiving tie-down means such as a steel strapping or bonding (not shown). In some instances, it may be desirable to secure loads to the flatbed using such strapping or bonding and the slots 48 will be useful for such purpose.

I claim:

1. In a railway flatbed car or the like:
   a generally rectangular flat lading supporting surface formed of a plurality of juxtaposed wooden timbers,
   a plurality of elongated upwardly opening channels arranged in parallel spaced apart relation and disposed in spaces between said timbers and extending substantially coextensively with the length thereof,
   a plurality of transversely extending webs secured in each channel and spaced apart therein, and a rod-like anchor disposed substantially within each channel and spaced from the bottom and walls thereof and secured to said webs, said web members being provided with through apertures adjacent the rod-like anchor for receiving therethrough tie-down means.

2. The invention defined by claim 1 wherein the upper edges of said channel and the upper surface of said rod-like anchor are substantially flush with the timber surface of the flatbed car.

3. The invention defined by claim 1 wherein the rod-like anchors of adjacent channels are displaced in opposite directions from the centerline of the channels.

* * * * *